UNITED STATES PATENT OFFICE.

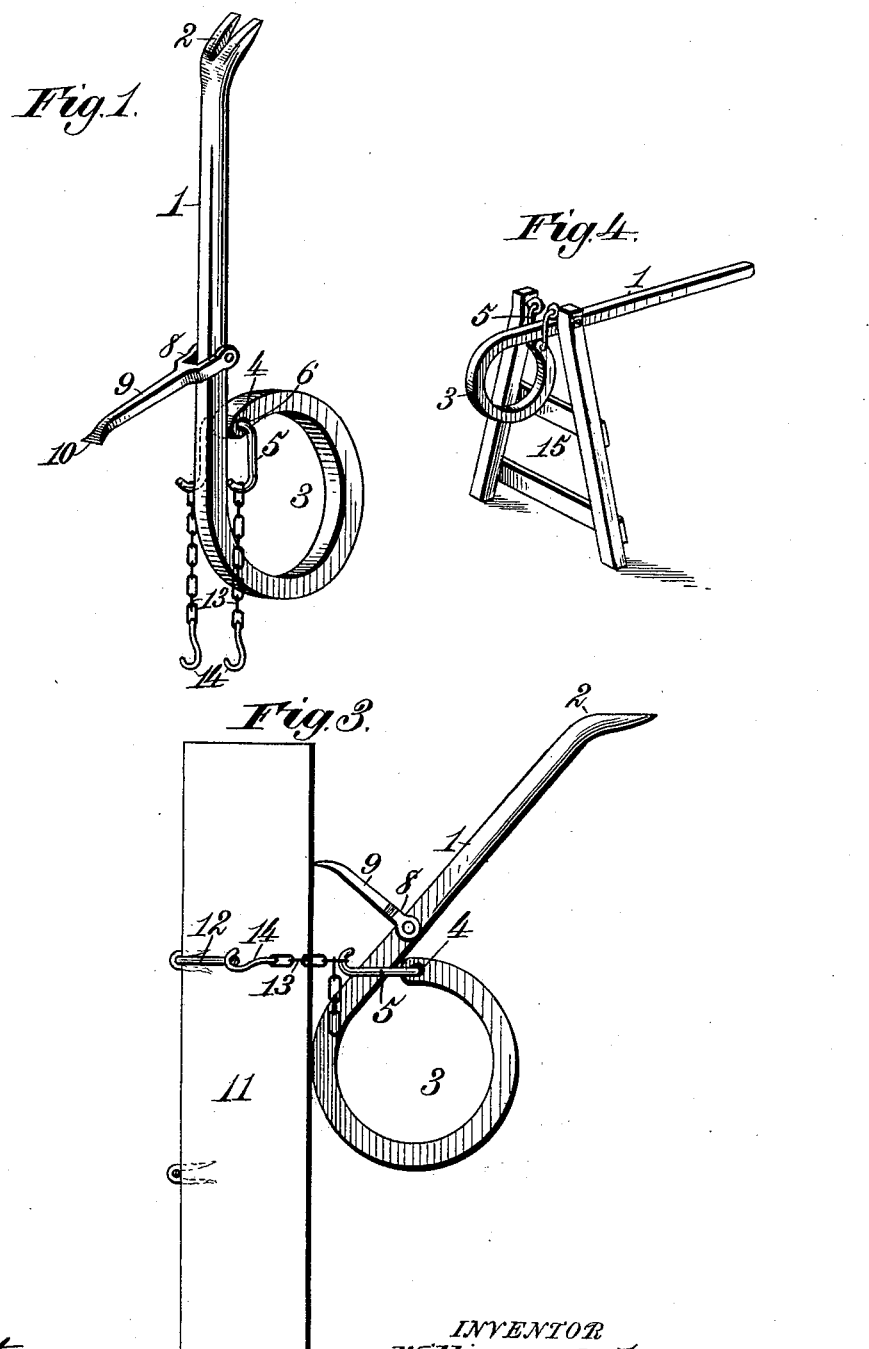

WILLIAM NEEB, OF CROSS PLAINS, TEXAS.

IMPLEMENT FOR STRETCHING WIRE-FENCE STRANDS.

SPECIFICATION forming part of Letters Patent No. 606,070, dated June 21, 1898.

Application filed November 26, 1897. Serial No. 669,899. (No model.)

*To all whom it may concern:*

Be it known that I, WILLIAM NEEB, a citizen of the United States, residing at Cross Plains, in the county of Callahan and State of Texas, have invented new and useful Improvements in Implements for Stretching Wire-Fence Strands, of which the following is a specification.

This invention relates to implements for stretching wire-fence strands, and has for its object to provide simple, convenient, and easily-operated means for attaching fence-wires and for straining such wires to take up the slack between fence-posts in a fence already constructed, also to furnish a wire-stretching implement which shall at the same time be adapted to hold the stretched wire securely while being fastened to or partly around a fence-post, the said implement to be also adapted for extraction of staples or old fasteners.

My invention consists in a wire tightening or stretching implement having the features of construction and novel combinations of parts hereinafter more particularly described and claimed.

In the annexed drawings, illustrating the invention, Figure 1 is a view of my improved wire-stretching implement complete. Fig. 2 is a view of the separate parts of the implement as disconnected or before being put together. Fig. 3 is a view illustrating the manner of using the implement for stretching a wire in a fence. Fig. 4 is a view illustrating how the lever-bar may be supported in order to utilize it as a wagon-jack.

Referring to the drawings, the reference-numeral 1 designates a bar of iron or steel having at one end a claw 2 for use in extracting staples or other wire-fasteners from a fence-post. At its other end the bar 1 is bent into a circle 3, that is situated in the same plane as the main portion of said bar. Where the extremity of the bar joins the main body to complete the circle 3 there is provided a perforation 4, in which a double hook 5 is pivotally supported. The two parts of this double hook 5 are rigidly connected by a journal 6, through which the said double hook is pivotally supported. It will be seen that the perforation 4 is preferably formed at the extremity of the bar, where the completed circle joins the main portion of the bar, and this journal 6 of the double hook is to be inserted into this perforation before the curved-around bar extremity is united to the main body or shank of said bar.

Above the circle 3 there is provided in the bar 1 a perforation 7 to receive a pivot that supports the bifurcated or slotted end 8 of a holding lever or pawl 9, the other end of which is curved downward and provided with a broadened chisel edge 10, that will be adapted to engage in the side of a fence-post 11, as shown.

For the purpose of applying strain to a fence-wire, as 12, there are provided chains 13, each of which has a hook 14 at one end. These hooks are to be engaged with the fence-wire at opposite sides of a post, and then a convenient link of each chain will be detachably engaged with one side or prong of the double hook 5, that is pivotally supported in the wire-stretching implement, as already described.

Before attaching the chains 13 the wire tightening or stretching implement is to be placed vertically against that side of the fence-post which is opposite the side where the fence-wire passes. The pawl or holding-lever 9 is elevated toward the claw 2, and the circle end of the implement is made to bear firmly against the post. The chains 13 are then hooked onto the fence-wire and are adjustably connected at convenient links with the double hook 5, as shown. By now grasping the upper end of the lever-bar 1 and drawing it outward or away from the fence-post the circle 3 will act as a fulcrum against the post at a point below the chains 13, and thus these chains will exert a straining action to draw the fence-wire around or partly around the post from opposite sides thereof. It will be observed that the manner of attaching the chains 13 to the double hook 5 at any link of said chains will provide for adjusting the chains as required.

As the upper end of the lever-bar 1 is drawn outward the chisel end of the pawl 9 will drop into firm engagement with the fence-post and thus cause the implement to hold the fence-wire 12 secure until it can be permanently fastened. The fastening of the fence-wire 12 may be effected by means of staples driven into the post or by means of supplemental wire drawn tightly around the post and engaged with the main wire at each side or end, or any other convenient fastening means may be employed. When the fence-wire has been properly tightened and then secured at one fence-post, the implement is to be detached and the operation repeated at other posts wherever tightening the wires is required.

It will be obvious that the implement can be very easily operated. Its parts are few and simple and there is no liability to breakage or disarrangement.

By employing the double hook 5 as a means for suspending the lever-bar 1 in a suitable frame 15 the implement can then be utilized as a wagon-jack for lifting one end of an axle while a wheel is being removed or replaced. When the lever end of the bar 1 has been pressed downward, so that the turn of the circle 3 at the other end of said bar passes sufficiently under the axle to get the wheel clear of the ground, then the implement can be secured either by placing the pawl 9 against the wagon-bed or some other convenient part of the wagon, or the lever can be fastened down to the supporting-frame by means of a cord or chain.

What I claim as my invention is—

1. The herein-described wire-stretching implement, comprising a lever-bar having its lower end bent into a circle that is arranged in the same plane with the shank or body portion of said bar, a double hook pivotally supported in said bar and projecting from each side, and a pawl pivotally attached to the said lever-bar, substantially as and for the purpose specified.

2. A wire-stretching implement comprising a lever-bar having its lower end bent into a circle that is arranged in the same plane with the shank or body portion of said bar, a double hook pivotally supported in said bar at the junction between its body portion and its curved end, and a pawl pivotally attached to said lever-bar at a point above the said circle, substantially as and for the purpose specified.

3. A wire-stretching implement adapted to have a bearing against one side of a fence-post opposite where the fence-wire passes and comprising a lever-bar having a claw at one end and bent at its other end into a circle that is arranged in the same plane with the shank or body portion of said bar, a double hook pivotally supported in said bar, chains to engage with said double hook and with the fence-wire at each side of the fence-post, and a pawl pivotally attached to said lever-bar at a point above the said circle, substantially as specified.

4. In a wire-stretching implement, the combination of a lever-bar adapted to have a bearing against one side of a fence-post opposite where the fence-wire passes and provided with a claw at its upper end and with a circle at its lower end, a double hook pivotally supported in said bar and projecting on each side, chains adapted to adjustably engage said double hook and each provided at one end with a hook to engage the fence-wire, and a pawl pivotally attached to the said lever-bar and provided with a broadened chisel end, substantially as and for the purpose specified.

5. The combination of a lever-bar provided at one end with a circle arranged in the same plane with the shank or body portion of said bar, a double hook supported in said bar near the said circle and projecting from each side, and a pawl pivotally attached to the said lever-bar, substantially as described.

In testimony whereof I have hereunto set my hand in presence of two subscribing witnesses.

WILLIAM NEEB.

Witnesses:
G. B. SWAN,
W. J. COFFMAN.